C. & W. H. TUCKER.
Till-Alarms.
No. 5,566. Reissued September 9, 1873.
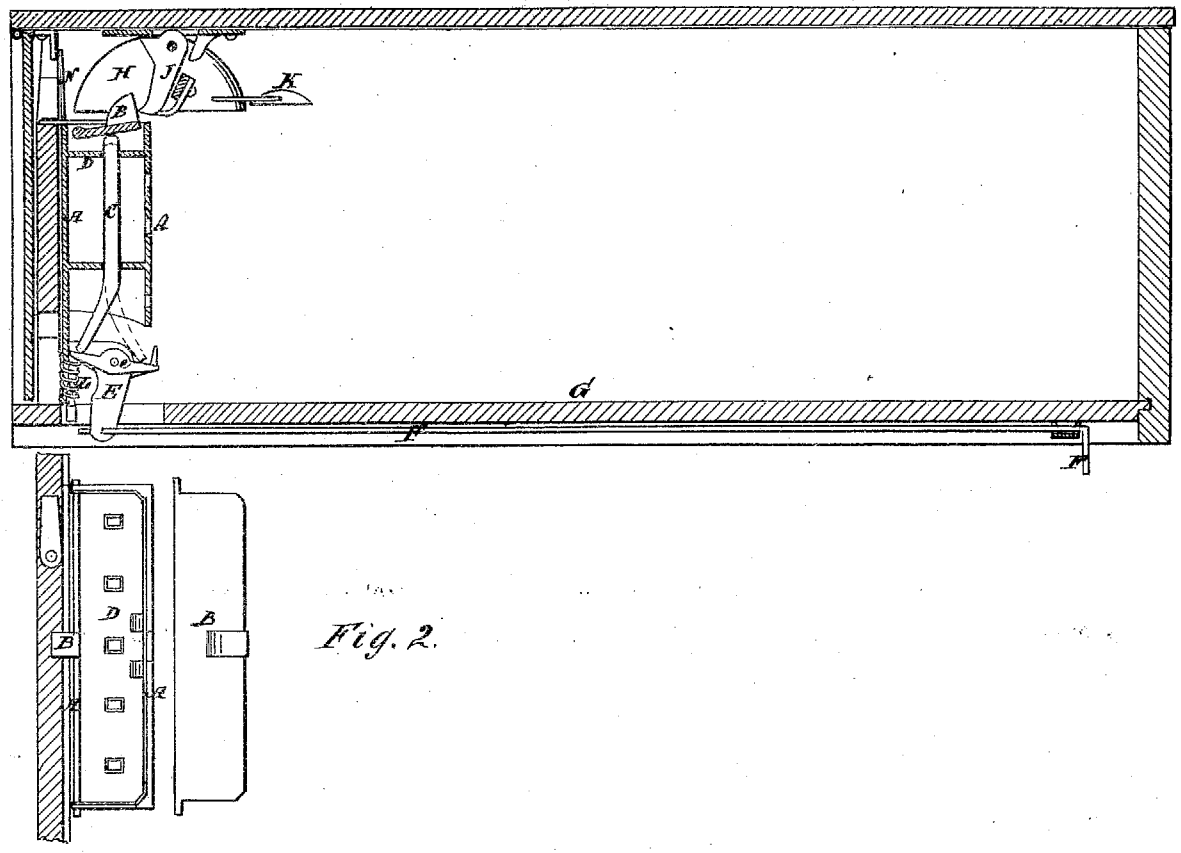
Witnesses:
E. Wolff.
J. Felbel.
Inventors:
C. Tucker and
W. H. Tucker.
by attorney
J. N. Mc Intire.
A.M. PHOTO-LITHOGRAPHIC CO. N.Y. (OSBORNE'S PROCESS.)

UNITED STATES PATENT OFFICE.

CYRUS TUCKER AND WILLIAM H. TUCKER, OF INDIANAPOLIS, INDIANA, ASSIGNORS, BY MESNE ASSIGNMENTS, TO NETTIE TUCKER AND ROBERT S. DORSEY.

IMPROVEMENT IN TILL-ALARMS.

Specification forming part of Letters Patent No. 110,092, dated December 13, 1870; antedated December 9, 1870; reissue No. 5,566, dated September 9, 1873; application filed May 28, 1873.

*To all whom it may concern:*

Be it known that we, CYRUS TUCKER and WILLIAM H. TUCKER, of Indianapolis, Indiana, have invented certain new and useful Improvement in Alarm-Tills; and we do hereby declare the following to be a full, clear, and exact description thereof, reference being had to the accompanying drawings and to the letters of reference marked thereon.

Previous to our invention a great variety of devices or mechanisms have been suggested and patented, adapted to serve the purposes of an alarm or a lock, or both, to money-drawers.

Our invention relates to that class of mechanisms which is intended to operate as both an alarm (when an attempt is made to open the drawer) and a lock, which may be set to require different combinations or manipulations at different times to open it; and has for its objects to provide such a mechanism as will efficiently serve the purposes of an alarm and lock, in which a variety of changes may readily be made in the tumblers requiring different combinations or a different manipulation of the keys at different times to open it. To these ends and objects our invention consists, first, in the use, in combination with the tumblers and the key mechanism of three-armed dogs or levers, by which the raising and lowering of the tumblers are effected, and each of which is so constructed that it can be made to sustain the tumbler rested on it in either an elevated or depressed position, as will be hereinafter more fully explained; secondly, in the use, in combination with a dog, stop, or projecting device attached to the counter, and a tumbler mechanism, of a catch-plate adapted to be raised and lowered by the action of the tumbler mechanism, as will be hereinafter more fully explained; thirdly, in the use, in combination with the catching-plate of the drawer, and the holding device or stop of the counter, of a pressure-spring, so arranged and operating as to exert a tendency to slide in the drawer, which will create sufficient friction or pressure, between the opposing or contact surfaces of said catch and stop, to prevent the movement of the former—necessary to the unlocking of the drawer—even when the proper tumblers are operated, as will be presently more fully explained.

In the accompanying drawings, Figure 1 is a vertical longitudinal section of drawer (and portion of the counter) provided with one of our improved alarm-locks. Fig. 2 embraces a top view of the lock with the catch-plate swung up and back, (for the purpose of exposing a view of the interior of the case,) and a detached view of the said catch-plate itself.

In the several views the same part will be found designated by the same letter of reference.

A is the cast-iron case or frame work of the lock, which is secured to the drawer as shown, and is provided with a hinged catch-plate, B, a series of tumblers, C, which slide in holes in guide-plates D D, and a series of three-armed levers or dogs, E, which are hung on pivots *e*, and from which extend, along the under side of the drawer bottom, the wires or rods F, the forward ends of which serve as the finger pieces or keys to be operated upon by the person in opening the drawer. An alarm-bell H, with apparatus arranged much in the usual manner for operating the hammer, is attached to the counter or table top I in such a manner that the catch-plate B, when in its normal position, will come against the projecting arm or lever J, and will so move it, when an attempt is made to open the drawer, as to cause it to trip the hammer-lever and make the hammer K strike the bell. The levers or dogs E—corresponding in number to the number of tumblers C—are made, as shown, with three arms to each, and are each pivoted or hung to turn freely on a horizontal wire, *c*, at the lower part of the case A. The forward and rear arms of these levers E serve as the rests for the support of, and the means by which to operate, the tumblers C, which are made in the form shown, and work or play loosely in holes in the guide-plates D D; and any desired number of such tumblers may be used, with, of course, a corresponding number of levers or dogs and pull-wires or key-rods. From the under side of the rear arm of each lever or dog E projects downward a short pin or stud; and immediately under each of said pins is located a stud projecting upward from the lower cross-bar of the frame.

When the dog E is vibrated on its axis *e* the adjacent ends of the lugs come in contact to prevent too great extent of motion in the dog. In this way they serve the purposes of a stop device; and they also perform the office of retaining in place the spiral spring L, which holds the dog E, with its tumblers C, in the proper position.

Those tumblers which are so placed as to rest on the rear and higher arms of the dogs or levers E serve to sustain the catch-plate B in the position as seen at Fig. 1, in which it will engage with, or come against, the locking arm or lever J; and, when the catch-plate has been allowed to fall, by depressing these tumblers, the spring L, upon releasement of the finger keys and rods F, or by the closing of the drawer, will return the parts to their former positions to again effect the locking.

Any number of the tumblers C less than all may be turned round and placed in the position indicated by the dotted lines in Fig. 1; and, when so turned, the tumblers, it will be understood, drop down too far to assist in the holding up of the catch-plate B, or prevent its falling when those tumblers which are turned the other way are depressed.

It will then be seen that just those particular keys which connect with the dogs which have tumblers resting on their rear arms must be pulled in order to permit the falling of the catch-plate and unlocking of the drawer; and it will be understood that if any one or more of the other keys be pulled at the same time one or more of the tumblers, which are resting on the forward arms of dogs E, will be elevated to hold up the catch-plate B and neutralize the effect of lowering the right tumblers, from all of which it will be seen that in order to effect the unlocking the precise combination of keys necessary to be pulled must be known to the person who attempts to open the drawer. By simply turning and shifting one or more of the tumblers C this combination may be changed as often as desirable. N is a spring, which is secured to the drawer G at the back side, and comes against any projecting portion of or a lug attached to the counter I in such a manner that when the drawer is closed and locked said spring will be put under tension, and will exert a continual tendency to force the drawer forward and hold the catch-plate B up against the lever J, and creates or maintains such a frictional contact between these devices as to make it necessary to push or thrust the drawer home to its rearmost position, in order to permit (when the proper keys shall have been pulled) the falling of the plate B.

From this arrangement it will be seen that even though the proper keys be pulled the plate B will not fall without this back push of the drawer, and that, hence, an attempt to open the drawer without a knowledge of the necessity of this movement will result in an alarm.

The forward portions of the dogs E may, of course, be made so much heavier than the rear, or may be so weighted as to render the springs L unnecessary without departing from the spirit of our invention.

What we claim as new, and desire to secure by Letters Patent, is—

1. The use, in combination with the key mechanism and tumbler device, of dogs or levers E, which are formed with rear and forward supporting-arms, arranged to vibrate or turn on a center, and to operate substantially as described.

2. In combination with a holding and locking or alarm-sounding lever or projection of the counter, a catch-plate, and a series of tumblers, arranged to rise and fall, and adapted to be operated upon by the tumbler mechanism of the lock, substantially as and for the purposes described.

3. In combination with the dog J of the counter and plate B of the drawer, which interlock with each other, a pressure-spring, N, for holding the said interlocking devices together by frictional contact independently of the tumblers, substantially as and for the purpose described.

In testimony whereof we have hereunto set our hands and seals.

CYRUS TUCKER. [L. S.]
WILLIAM H. TUCKER. [L. S.]

In presence of—
W. B. WELLS, Jr.,
CHAS. S. WELLES.